United States Patent [19]

Matt

[11] Patent Number: 4,903,543
[45] Date of Patent: Feb. 27, 1990

[54] CAMSHAFT FOR CONTROLLING VALVES IN INTERNAL COMBUSTION ENGINES AND METHOD OF MANUFACTURING THE CAMSHAFT

[75] Inventor: Lukas Matt, Eschen, Liechtenstein
[73] Assignee: Etablissement Supervis, Vaduz, Liechtenstein
[21] Appl. No.: 194,385
[22] Filed: May 16, 1988
[30] Foreign Application Priority Data
  May 22, 1987 [DE] Fed. Rep. of Germany ...... 3717190
[51] Int. Cl.⁴ .................... F16H 53/00; F01L 1/04
[52] U.S. Cl. .................... 74/567; 403/282; 403/359
[58] Field of Search .......... 74/567; 403/359, 282, 403/372; 123/90.6, 90.17, 90.34; 29/525, 509

[56] References Cited

U.S. PATENT DOCUMENTS

| | | | |
|---|---|---|---|
| 581,476 | 4/1897 | Blaton, Jr. | 403/359 X |
| 1,403,309 | 1/1922 | Follows | 403/282 X |
| 3,438,660 | 4/1969 | Steiner | 403/372 X |
| 3,619,882 | 11/1971 | Sobanski et al. | 403/359 X |
| 3,743,334 | 7/1973 | Witsenhausen-Adelman | 403/282 X |
| 3,872,578 | 3/1975 | Ullom | 29/525 |
| 4,236,495 | 12/1980 | Rosan, Jr. | |
| 4,265,388 | 5/1981 | Takahashi et al. | 403/359 X |
| 4,279,275 | 7/1981 | Stanwood et al. | 403/359 X |
| 4,321,987 | 3/1982 | Dressell, Jr. et al. | 403/282 X |
| 4,376,333 | 3/1983 | Kanamaru et al. | 403/282 X |
| 4,438,555 | 3/1984 | Tsumuki et al. | 74/567 |
| 4,569,614 | 2/1986 | Yamauchi et al. | 403/372 X |
| 4,730,581 | 3/1988 | Fujita et al. | 123/90.6 |
| 4,779,326 | 10/1988 | Ichikawa | 403/282 X |

FOREIGN PATENT DOCUMENTS

| | | | |
|---|---|---|---|
| 119112 | 9/1984 | European Pat. Off. | 74/567 |
| 2159264 | 6/1973 | Fed. Rep. of Germany . | |
| 2546802 | 4/1977 | Fed. Rep. of Germany . | |
| 2838995 | 3/1979 | Fed. Rep. of Germany . | |
| 2939037 | 4/1981 | Fed. Rep. of Germany | 403/282 |
| 3128522 | 2/1983 | Fed. Rep. of Germany . | |
| 3321846 | 12/1983 | Fed. Rep. of Germany . | |
| 3227693 | 1/1984 | Fed. Rep. of Germany . | |
| 3323640 | 1/1984 | Fed. Rep. of Germany . | |
| 3717190 | 12/1988 | Fed. Rep. of Germany . | |
| 355321 | 10/1905 | France | 123/90.17 |
| 60-129464 | 7/1985 | Japan . | |

Primary Examiner—Rodney M. Lindsey
Attorney, Agent, or Firm—Toren, McGeady & Associates

[57] ABSTRACT

A camshaft for controlling valves in internal combustion engines includes a shaft and at least one cam slid onto and connected to the shaft. The cam has a recess for receiving the shaft. The recess has at least one radially inwardly directed projection which engages a corresponding groove in the shaft. At least one portion of the area of the shaft in which the cam is to be provided has a diameter which is greater than the remaining areas of the shaft. The increased diameter portion of the shaft is a bead-like material displacement which extends circumferentially on the shaft and is manufactured by rolling. The cam is forced onto the increased diameter portion of the shaft with a projection in the recess of the cam forming in a chip-removing operation a groove in the increased diameter portion.

3 Claims, 1 Drawing Sheet

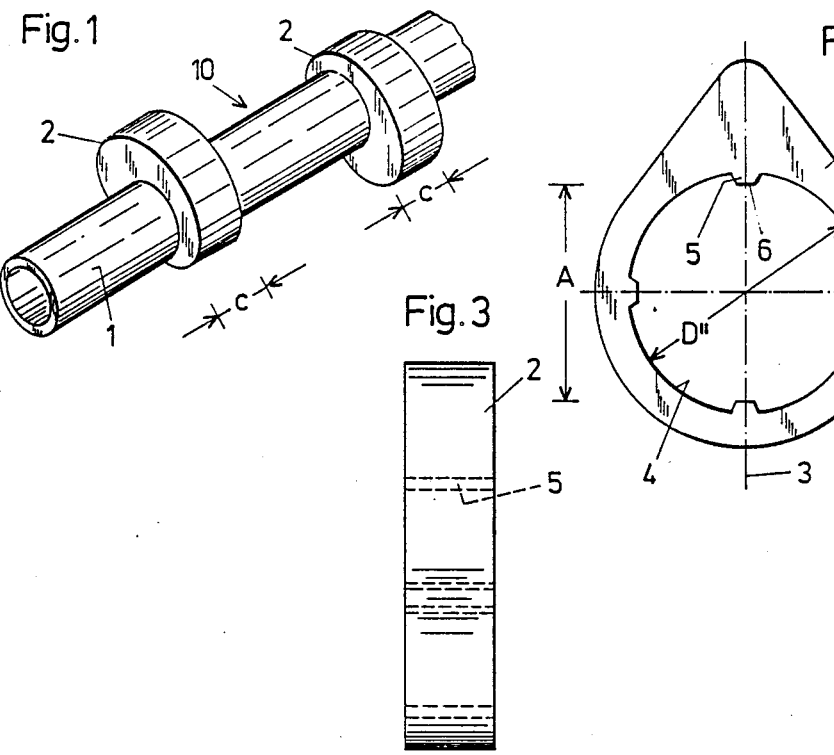
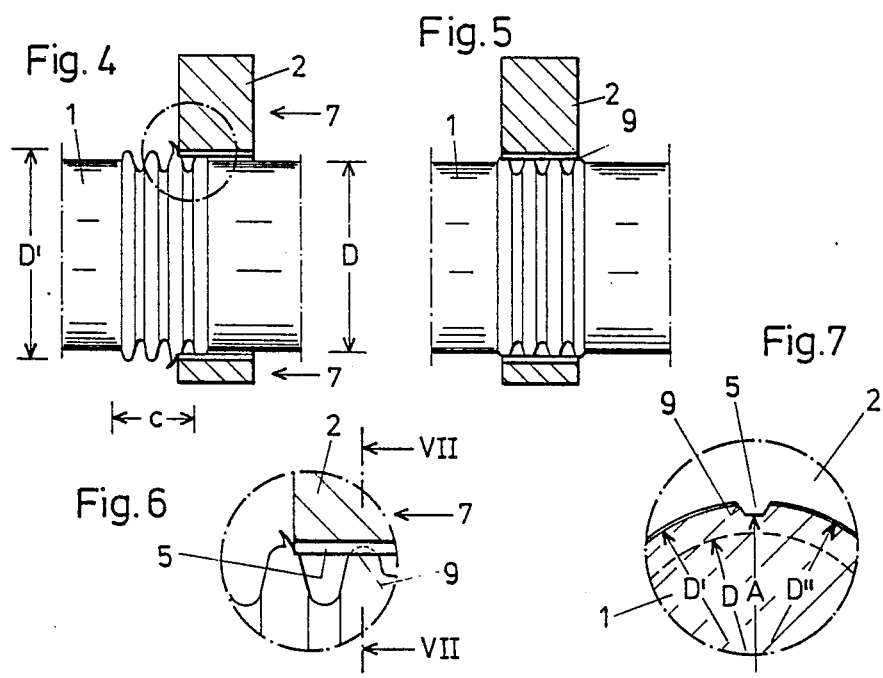

CAMSHAFT FOR CONTROLLING VALVES IN INTERNAL COMBUSTION ENGINES AND METHOD OF MANUFACTURING THE CAMSHAFT

BACKGROUND OF THE INVENTION

1. Field of the Invention

The present invention relates to a camshaft for controlling valves in internal combustion engines. The camshaft includes a shaft and at least one cam slid onto and connected to the shaft. The cam has a recess for receiving the shaft. The recess has at least one radially inwardly extending projection which engages a corresponding groove in the shaft.

The present invention also relates to a method of manufacturing the above-described camshaft.

2. Description of the Prior Art

Camshafts are known in which the cams and the shafts are manufactured separately and are then joined to form a structural unit. In a known construction of this type, for example, from German Offenlegungsschrift 28 38 995 or German Offenlegungsschrift 33 21 846, the shaft has a plurality of axially extending grooves and the bore of the cam has a corresponding radial projection which engages this groove. The bore of the cam surrounds the shaft with play, however, the above-mentioned projection has radially such a size that the cams and the shafts can be joined with frictional engagement and remain in engagement. After the cams and the shafts have been joined, the gap existing as a result of the above-mentioned play is filled from the outside with hard solder. The number of grooves provided circumferentially on the shaft is provided as required by the phase relation of the cams for the respective use of the camshaft. This known construction is not advantageous because a complicated operation is required for manufacturing the grooves on the shaft in the correct positions. Thus, the grooves must be manufactured very exactly and they must also be exactly positioned with respect to their angular positions.

From German Offenlegungsschrift 32 27 693 it is also known to slide a finished cam onto a finished hollow shaft in the correct position and to widen the hollow shaft from the inside in order to obtain a fixed connection between the cams and the shafts. As a result, a press fit between the hollow shaft and the individual cams is obtained. For increasing the press fit, the hollow shaft is filled with plastics material and the hollow shaft becomes a load-bearing composite structural component by pressing in the plastics material. The pressure required for widening the hollow shaft is generated by pressing in the plastics material. This method is very complicated. In addition, the tensions acting on the cams are extremely great due to the necessary press fit because the cams are exclusively held on the shaft through frictional engagement. Accordingly, it is not possible to use cams which are manufactured by sintering because sintered cams cannot absorb the occurring tensions over time without suffering damage. Forged or rolled cams may be capable of absorbing the occurring tensions without reducing the service life thereof. However, the manufacture of the cams becomes complicated when the cams are manufactured by forging or rolling.

The camshafts manufactured in accordance with German Offenlegungsschrift 25 46 802 also includes a hollow shaft. Portions of the hollow shaft are widened by inserting a rubber rod whose diameter corresponds to the inner diameter of the hollow shaft and which is pressed together from the opposite side of the hollow shaft. For the above-mentioned reasons, this type of camshaft has not been found useful.

Instead of widening portions of the hollow shaft from the inside, it is also known from German Offenlegungsschrift 33 23 640 to provide radial projections on the bore surfaces of the cams and to select the diameter of the hollow shaft in such a way that the cams can be slid onto the shaft and positioned on the shaft without requiring significant force. Subsequently, the shaft is expanded over its entire axial length by means of a mandrel which is pulled through the hollow shaft. For reasons of stability, the hollow shafts used in this case have a substantial wall thickness, so that the widening of the shaft, whether carried out over portions thereof or over the entire length thereof, requires substantial deforming forces which also influence the initial geometry of the hollow shaft. This is a disadvantage because it is the present tendency that sintered cams are used which are extremely accurate to size and do not receive further surface finishing. However, this requires that the hollow shaft has geometrically accurate dimensions.

German Offenlegungsschrift 31 28 522 describes a camshaft in which the cam is tangentially adjustable relative to the shaft. Also in this case, the cam is a separately manufactured component and is fastened on the shaft by means of a sleeve with a press fit. The sleeve has a cylindrical bore which corresponds to the diameter of the shaft. The outer surface of the sleeve is truncated-cone shaped which corresponds to a similar conical bore in the corresponding cam, wherein a compressed oil connection is provided in each cam in the conical bore in the region of its greatest diameter. Another compressed oil connection is provided in the shaft next to the respective cam, wherein this compressed oil connection leads to the inner bore of the sleeve through a compressed oil duct. As a result of the feature, no axial forces, i.e., forces acting in the direction of the shaft, occur when the connection between the shaft and the sleeve with cam is separated by exerting pressure on the compressed oil connection. As a result, after the cam including sleeve have been separated, the cam can be rotated, i.e., can be adjusted in tangential direction. This can be done without any additional undesired adjustments which would later have to be reversed. Thus, it becomes unnecessary to once again slide the cam onto the sleeve.

Finally, it should be noted that it is known from German Offenlegungsschrift 21 59 264 to connect a flange with a hub by means of chip-removing pressing the flange onto the hub by mutually sliding the flange provided with a toothing onto a support shoulder of the hub. Compared to the flange, the hub has a short axial length, with only one flange being arranged on the hub.

A camshaft is a structural machine element of a special type because it is subjected during operation to very extremely dynamic stresses. Accordingly, in all known camshafts, a material-locking and/or positively locking connection between the shafts and cams is present. If the cams are to be securely fixed on the shaft exclusively by means of a press fit, the press-fit connection must be very strong which means that extremely high static loads act on the cam onto which additional dynamic loads are superimposed during operation. Cams which are manufactured by sintering are unable to absorb without damage loads of this type over a longer period of time. This is true at least for sintered cams as they are manufactured in accordance with the present state of the manufacturing art and the materials for sintering purposes available today.

It is, therefore, the object of the present invention to provide a camshaft in which sintered cams are used, while the necessary radial pressure between cam and tube is only of such a magnitude that loads occur which can be absorbed by the sintered cam over a long period of time. Still, the support between the shaft and the cams is to be reliable and secure.

SUMMARY OF THE INVENTION

In accordance with the present invention, at least the portion of the area of the shaft in which the cam is to be provided has a diameter which is greater than the remaining areas of the shaft. The increased diameter portion of the shaft is formed for receiving the cam by a bead-like material displacement which extends circumferentially on the shaft and is manufactured by rolling. The cam is forced onto the increased diameter portion of the shaft with a projection in the recess of the cam forming in a chip removing operation a groove in the increased diameter portion.

The procedure of forming the bead-like material displacement on the shaft by rolling does not place a substantial load on the hollow shaft. Accordingly, the tubular shaft is not subjected to substantial deformation. By forming the beads by means of the material displacement by rolling, free spaces are formed which receive the chips which are formed when the cams are slid onto the increased diameter portion of the shaft. If the beads formed by material displacement extend parallel to each other, a varying reaction force acts on the cam being slid onto the shaft. The magnitude of this force depends upon whether the front edge of the inwardly directed projection is beginning to cut into such a bead or cuts through a bead or is located in a free space between two adjacent beads.

In accordance with an advantageous further development of the invention, the circumferentially extending beads formed by material displacement have a pitch in the manner of a thread. In this case, a constant reaction force is generated when the cam is slid onto the increased diameter portion of the shaft.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there is illustrated and described a preferred embodiment of the invention.

BRIEF DESCRIPTION OF THE DRAWING

In the drawing:

FIG. 1 is a perspective view of a camshaft with two cams;

FIG. 2 is a front view, on a larger scale, of a cam of the camshaft shown in FIG. 1;

FIG. 3 is a side view of the cam of FIG. 2;

FIG. 4 is a partial longitudinal sectional view of a camshaft illustrating the cam being slid onto the increased diameter portion of the shaft;

FIG. 5 is a partial longitudinal sectional view of the camshaft with the cam being shown slid onto the increased diameter portion of the shaft;

FIG. 6 is a detail, on a larger scale, from FIG. 4; and

FIG. 7 is a view and a partial section of the detail of FIG. 6, taken along sectional line VII—VII of FIG. 6.

DETAILED DESCRIPTION OF THE INVENTION

As illustrated in FIG. 1 of the drawing, a camshaft 10 is formed of a tubular shaft 1 and cams 2 which are fastened on shaft 1. The cams 2 are spaced apart from each other in axial direction of shaft 1. In addition, the cams are angularly offset relative to each other in accordance with the phase relation of the engine elements of the internal combustion engine to be actuated by means of the camshaft 10.

FIG. 2 of the drawing is a front view of a cam 2 illustrated on a larger scale as compared to FIG. 1. Cam 2, i.e., its outer contour, is symmetrical relative to axis 3. Cam 2 has a recess 4 which in its circumferential contour corresponds to the cross-sectional shape of shaft 1. The significance of diameter D" shall be explained in more detail below.

Recess 4 of cam 2 has four radially inwardly directed projections 5 which extend over the entire axial length of the cam or recess 4. In the illustrated embodiment, projection 5 has an essentially rectangular cross-section, however, other cross-sectional shapes are also conceivable and possible. As illustrated in FIG. 2, four projections 5 are provided. It is within the scope of the present invention, to provide a different number of projections 5 over the circumference of recess 4. Preferably, projections are arranged with equal angular spacings. Cam 2 is sintered, i.e., it is manufactured by a powder metallurgical process.

The tubular piece which forms the carrier of the cams of the camshaft 10 has an outer diameter D which is slightly smaller than the spacing A between the inner surfaces 6 of the diametrically oppositely located projections 5 shown in FIG. 2. Accordingly, in the region in which the shaft 1 has diameter D, the cam 2 can be slid onto the shaft without requiring a special application of force.

When the cam 2 is to be positioned on shaft 1 in region C, as shown in FIG. 4, the shaft 1 is widened in this region until the outer diameter D' of this increased diameter portion C is slightly smaller than D" by, for example, 0.1 mm, while being significantly greater than A, for example, by 0.8 mm.

The portion C with the increased diameter D' is formed by rolling in a chipless manner circumferential beads or raised portions on the shaft as this is known in the manufacture of threads. The beads or raised portions may be circumferentially closed or be provided with a pitch in the manner of a thread. These beads or raised portions can be manufactured with great accuracy to size and high surface quality and with unbroken fiber structure. Thus, portion C with increased diameter D' is obtained by means of pressure deformation.

As illustrated in FIG. 4, the cam 2 is now pressed in the appropriate angular position by means of a suitable tool, not shown, onto the increased diameter portion C, as indicated by arrows 7. As a result of the above-described geometry between corresponding parts, each projection 5 forms in a chip-removing procedure in the manner of a planing tool a groove 9, as illustrated in FIG. 7. The detail in the cycle of FIG. 4 is shown on a larger scale in FIG. 6. The projection 5 itself forms in a chip-removing procedure the groove 9 which receives the projection. FIG. 5 shows the cam 2 in its intended position on the shaft 1. Once the cam 2 has reached its intended position, the cam 2 is securely and rigidly seated on the increased diameter portion C. This chip-removing cutting or broaching of the hard cam by means of the sharp cutting edge 6 results in a tight fit of the cam on the shaft. In its effect, this tight fit corresponds to a press fit acting on the existing number of cutting edges. Additionally, since the cutting edges which form the groove 9 in a chip-removing manner when the cam is pressed on are wedged onto the shaft in a positively locking manner, the cams are secured against rotation.

Since the parts to be fastened together may have great permissible tolerance ranges because the cams form their own path and, thus, each cam cuts its own individual volume from the increased diameter portion C, substantial advantages compared to other camshafts are obtained. Specifically, the cams are secured against rotation. The cam material is not substantially stressed and the stress can be securely and permanently absorbed even by a sintered cam. The individual components to be fastened together can be economically manufactured. Finally, the camshaft can be assembled economically.

As a rule, several cams 2 are arranged on a shaft 1, as illustrated in FIG. 1. In that case, the camshaft 10 is manufactured as follows. A first portion C is widened and the prepared cam is pressed onto first portion C. Subsequently, a second portion C is widened and the next cam is pressed onto the second portion C in the correct angular position. This procedure is repeated until all cams are placed on shaft 1.

As illustrated in the drawing, the increased diameter portion C extends only over a short longitudinal length of shaft 1. It is within the scope of the invention to roll beads or raised portions for increasing the diameter of the shaft 1 over the entire length of shaft 1 and to press the cams 2 individually into the intended angularly correct positions. This is possible because the formation of chips during the preparation of groove 9 is continuously interrupted so that the cutting edge is always released within short distances.

In all above-described cases, the cam 2 is supported on the shaft in a frictionally-engaging and form-locking manner in the region of portion C of the shaft which has an increased diameter $D^1$ as compared to the remaining portions of the shaft. The positively locking engagement is absolutely without play because one of the interlocking components itself forms the locking connection with the other component.

When the camshaft 10 is produced in large numbers, it is advantageous to use identically constructed cams 2, i.e., cams which not only are identical with respect to their circumferential contour but also with respect to size, position and number of projections 5 in recess 4. To assemble the camshaft 10, the cams 2 are then slid onto shaft 1 angularly offset relative to each other in order to achieve the necessary and required phase relations. Initially, a first portion C with increased diameter D' is made on shaft 1 and the corresponding cam is then pressed onto this first portion C. Subsequently, a second portion C with increased diameter D' is prepared and the next cam is pressed on to this second portion C. This sequence is repeated until all cams are placed on the camshaft.

The above-described construction is particularly suitable for cams which are manufactured by sintering. However, it is also possible to use cams which are manufactured in a different manner. However, sintered cams are preferred because they can be manufactured simply, inexpensively and with great accuracy to size.

A particular advantage of the camshaft according to the present invention resides in the fact that, apart from the above-described widening of the shaft, a special finishing operation of the shaft is not necessary. In addition, the prefabricated parts, i.e. shafts 1 and cams 2, can be assembled into the finished state at normal room temperature.

While a specific embodiment of the invention has been shown and described in detail to illustrate the application of the inventive principles, it will be understood that the invention may be embodied otherwise without departing from such principles.

I claim:

1. In a camshaft for controlling valves in internal combustion engines, the camshaft including a shaft and at least one cam slid onto and connected to the shaft in an area of the shaft, the cam defining a recess for receiving the shaft, the recess having at least one radially inwardly directed projection which engages a corresponding groove defined in the shaft, the improvement comprising at least a portion of the area of the shaft in which the cam is to be connected having a diameter which is greater than the diameter of the shaft, the increased diameter portion of the shaft being a bead-like material displacement which extends circumferentially on the shaft, wherein the cam is configured to be forced onto the increased diameter portion of the shaft with the at least one projection in the recess of the cam forming in a chip-removing manner the groove in the increased diameter portion.

2. The camshaft according to claim 1, wherein the material displacement is obtained by rolling.

3. The camshaft according to claim 1, wherein the cam is of sintered material.

* * * * *